(12) United States Patent
Juan

(10) Patent No.: US 6,546,950 B1
(45) Date of Patent: Apr. 15, 2003

(54) LACQUER BULLET GUN GAS ENTRY VALVE

(76) Inventor: Chih-Chen Juan, No. 278, Lan Tan, Tung-Yang Hsin-Chun Chiayi City (TW)

( * ) Notice: Subject to any disclaimer, the term of this patent is extended or adjusted under 35 U.S.C. 154(b) by 0 days.

(21) Appl. No.: 09/993,828

(22) Filed: Nov. 5, 2001

(51) Int. Cl.$^7$ ............................ F16K 31/12; F41B 11/00
(52) U.S. Cl. .......................... 137/270; 251/12; 124/73
(58) Field of Search ............................. 137/269, 270; 124/73; 251/12

(56) References Cited

U.S. PATENT DOCUMENTS

| | | | | |
|---|---|---|---|---|
| 2,594,185 | A | * | 4/1952 | Lefever ........................ 124/76 |
| 5,613,483 | A | * | 3/1997 | Lukas et al. .................. 124/73 |
| 5,669,369 | A | * | 9/1997 | Scott ............................ 124/73 |
| 5,791,328 | A | * | 8/1998 | Alexander .................... 251/76 |
| 6,360,736 | B1 | * | 3/2002 | Juan ............................. 124/73 |
| 6,418,920 | B1 | * | 7/2002 | Marr ............................. 124/73 |

* cited by examiner

Primary Examiner—David A. Scherbel
Assistant Examiner—John Bastianelli
(74) Attorney, Agent, or Firm—Pro-Techtor International Services

(57) ABSTRACT

A lacquer bullet gun gas entry valve, placed inside the lacquer bullet gun at an entrance of a conduit between an expansion chamber and a bullet chamber. The lacquer bullet gun gas entry valve comprises a valve body and a shutter. The valve body has a passageway, allowing compressed gas to pass to the bullet-chamber. The shutter tightly closes a front end of the valve body. The shutter has a first surface to which a first rod is attached and a second surface opposite to the first surface to which a second rod is attached, which is aligned with the first rod on a common axis. Depending on how the shutter is oriented, the first or second rod pass through the passageway, having a far end which extends beyond a rear end of the valve body, so that pushing of the far end by the firing device causes the shutter to be opened. Several longitudinal grooves are cut into the far end both of the first and the second rod, providing a path for compressed gas to push back the firing device. The longitudinal grooves of the first rod and the longitudinal grooves of the second rod have different total cross-sections, permitting different quantities of gas to flow through, allowing to adapt to various gas driving agents with various operating pressures.

3 Claims, 6 Drawing Sheets

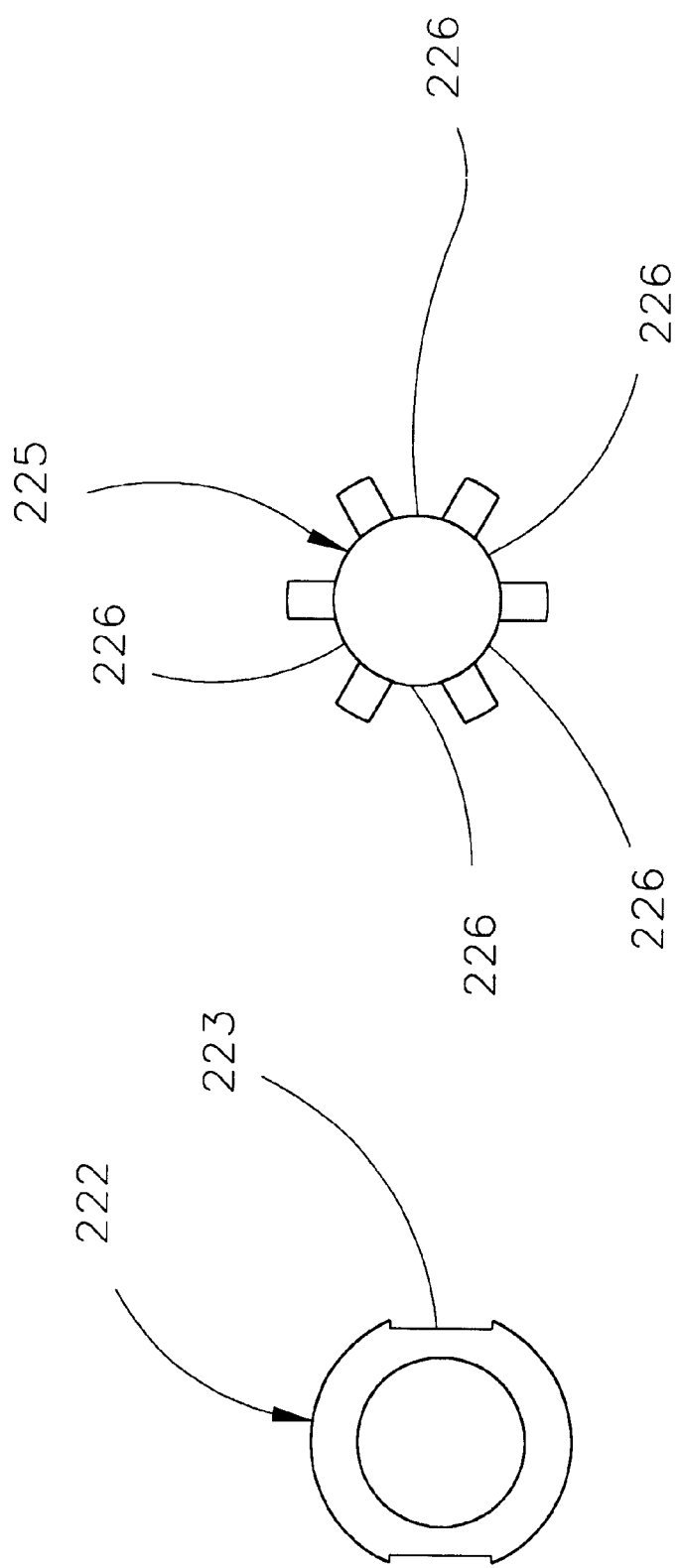

LACQUER BULLET GUN GAS ENTRY VALVE

BACKGROUND OF THE INVENTION

1. Field of the Invention

The present invention relates to a lacquer bullet gun gas entry valve, particularly to a lacquer bullet gun gas entry valve providing controlled entry of compressed gas.

2. Description of Related Art

As shown in FIG. 5, a conventional lacquer bullet gun mainly comprises: a gun case 1; a barrel 2 at a front end of the gun case 1; a bullet chamber 3 at a rear end of the barrel 2; a feeding hole 4 above the bullet chamber 3, feeding one lacquer bullet 5 at a time into the bullet chamber 3, which are subsequently driven out through the barrel 2 by compressed gas; a firing device 6 inside the gun case 1, performing rearward and forward movements, while moving forward pushing the lacquer bullet 5 into the bullet chamber 3 to be fired; a gas container 8, supplying compressed gas through a pressure-reducing valve 9 into an expansion chamber 10, which is located below the bullet chamber 3 and connected thereto by a conduit 11; and a gas entry valve 12. The gas entry valve 12 further comprises: a valve body 13, a shutter 15, a spring 16 and a piston 17. The valve body 13 is placed in the expansion chamber 10 at an entrance of the conduit 11 and has a central axis, defining a longitudinal direction, along which a passageway 14 runs. An opening 141 is placed on an upper side of the passageway 14, being aligned with the conduit 11, so that the passageway 14 and the conduit 11 are connected. The shutter 15 is located on the central axis of the valve body 13, having a sealing element for sealing the shutter 15 against the valve body 13, preventing gas from entering the passageway 14 within the valve body 13. A rod 151 is attached to the shutter 15 and passes through the passageway 14 along the longitudinal direction, having a rear end that reaches out of a rear side of the valve body 13 opposite to the shutter 15. The spring 16 pushes the shutter 15 tight on the valve body 13. The piston 17 is connected to a lower part of the firing device 6, glidingly moving within the expansion chamber 10.

When the firing device 6 moves forward, the piston 17 moves along and pushes the rod 151 forward, causing the shutter 15 to separate from the valve body 13 and allowing compressed gas to enter the bullet chamber 3 through the passageway 14 in the valve body 13 to drive out the lacquer bullet 5 through the barrel 2. When the shutter 15 opens, pushed by the piston 17, gas partly enters a rear section of the expansion chamber 10 through a gap between the rod 151 and a rear end of the passageway 14, pushing the piston 17 rearward, so that the firing device 6 returns to a ready state, as before firing.

For controlling gas flow into the rear section of the expansion chamber 10 and pressure exerted there to prevent too large a pressure from pushing the piston 17 rearward too fast and, on the other hand, to create sufficient pressure to push the piston 17 rearward, the rear end of the rod 151 carries a blocking part 153. The blocking part 153 has several longitudinal grooves 154 and has a diameter that is equal to the diameter of the passageway 14. Thus gas from the passageway 14 is blocked from passing, except for the grooves 154. The number and widths of the grooves 154 determine the flow of gas into the rear section of the expansion chamber 10 and gas pressure there, controlling gas pressure on the piston 17.

The number and width of the grooves 154 needs to be adapted to the compressed gas pressure at which the lacquer bullet gun operates for the lacquer bullet gun to work regularly. However, various gases are used as driving agents which have various operating pressures. Nowadays, mainly carbon dioxide and nitrogen are used, with carbon dioxide having a larger operating pressure than nitrogen. Therefore, using nitrogen as a driving agent requires a larger number of grooves 154 at the rear end of the rod 151 at the shutter 15 to form a wider path for gas to flow into the rear section of the expansion chamber 10 to develop sufficient pressure on the piston 17. If, on the other hand, carbon dioxide is used as a driving agent, the number or widths of the grooves 154 has to be reduced, so as to reduce pressure on the piston 17 and preventing the piston 17 from moving back too fast.

Adapting the gas entry valve to various driving agents with various operating pressures requires different designs thereof. Especially, when carbon dioxide as a driving agent is replaced by nitrogen, pressure to push back the piston 17 is insufficient. When nitrogen as a driving agent is replaced by carbon dioxide, pressure to push back the piston 17 is too large, possibly resulting in breakdowns. Conventional lacquer bullet guns are thus restricted to one type of driving agents, which is rather inconvenient.

Since gas entry valves for two different driving agents cannot be exchanged, two types of gas entry valves for lacquer bullet guns have to be employed, increasing working effort and cost of production.

SUMMARY OF THE INVENTION

It is the main object of the present invention to provide a lacquer bullet gun gas entry valve, allowing to use various driving agents for the lacquer bullet gun without modification.

Another object of the present invention is to provide a lacquer bullet gun gas entry valve, allowing to use two agents for the lacquer bullet gun at the same time for better convenience.

The present invention can be more fully understood by reference to the following description and accompanying drawings.

BRIEF DESCRIPTION OF THE DRAWINGS

FIG. 3A is an cross-sectional view of the blocking part on the far end of the first rod of the present invention.

FIG. 4A is an cross-sectional view of the blocking part on the far end of the second rod of the present invention.

DETAILED DESCRIPTION OF THE PREFERRED EMBODIMENT

Figure 1:
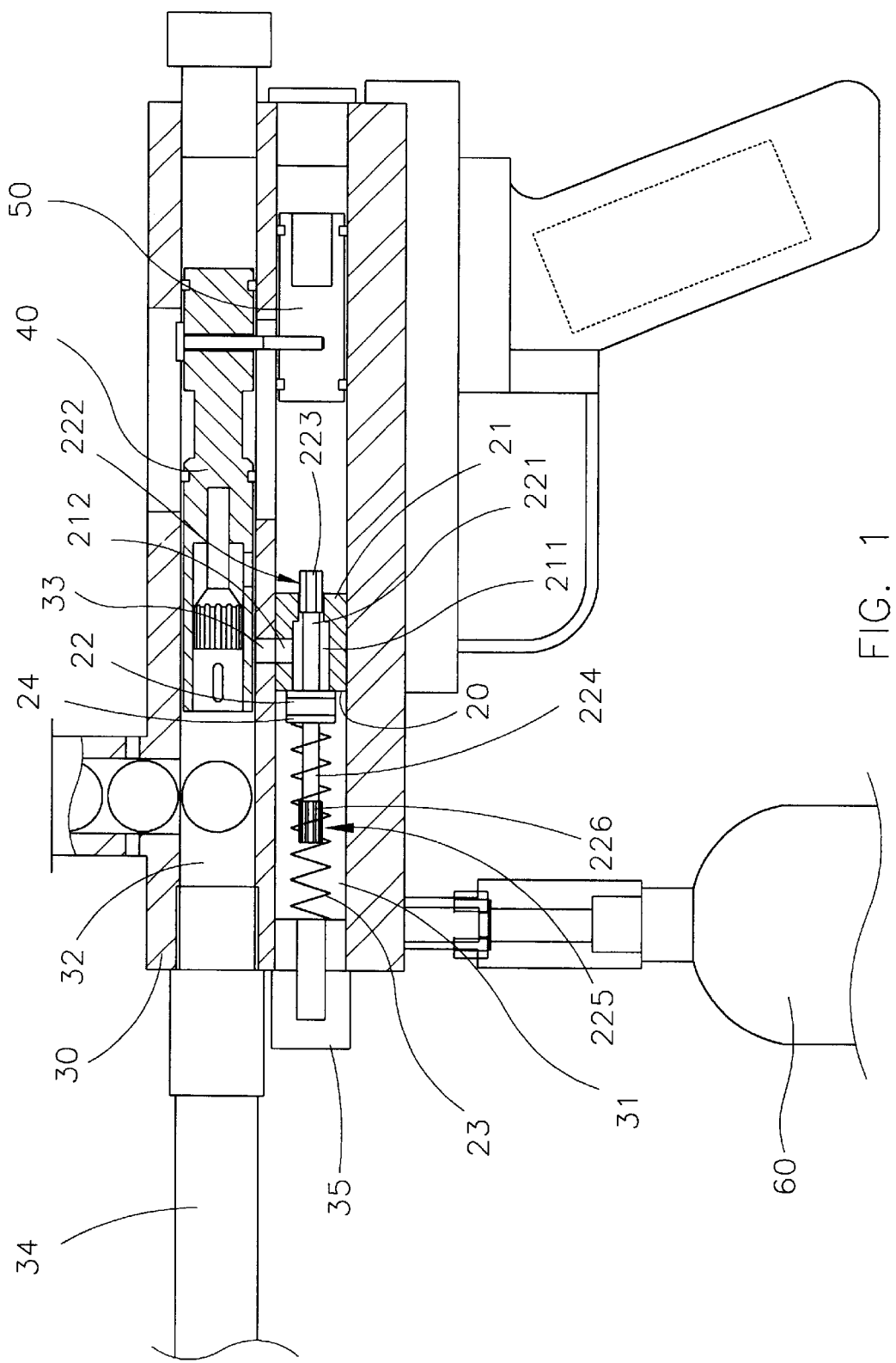
FIG. 1 is a sectional side view of the lacquer bullet gun gas entry valve of the present invention in conjunction with a lacquer bullet gun.

As shown in FIG. 1, the lacquer bullet gun gas entry valve of the present invention is a gas entry valve 20, used in conjunction with a lacquer bullet gun which comprises: a gun case 30; a barrel 34 at a front end of the gun case 30 through which lacquer bullets are fired, defining a forward direction; a bullet chamber 32 at a rear end of the barrel 34; an expansion chamber 31, located below the bullet chamber 32, having front and rear sections; a firing device 40, performing forward movements for pushing lacquer bullets one at a time into the bullet chamber 32 to be fired; a piston 50 in the rear section of the expansion chamber 31, connected with the firing device 40; and a gas container 60, supplying compressed gas into the expansion chamber 31, which is subsequently let through the gas entry valve 20 into the bullet chamber 32 to drive a lacquer bullet through the barrel 34.

The gas entry valve 20 comprises: a valve body 21, a shutter 22 and a spring 23. The valve body 21 is placed in a middle section of the expansion chamber 31 inside the gun case 30, separating the front and rear sections thereof, and has a central axis, which defines a longitudinal direction and along which a passageway 211 runs. An opening 212 is placed on an upper side of the passageway 211, being aligned with a conduit 33 to the bullet chamber 32. Thus gas in the expansion chamber 31 is led through the passageway 211 in the valve body 21 and the opening 212 into the bullet chamber 32. The shutter 22 is placed at a front end of the valve body 21 on the central axis thereof and is longitudinally movable, having a first surface and a second surface opposite thereto, with a sealing element 24 being attached to each of the first and second surfaces. Thereby the shutter 22 is sealed against the front side of valve body 22, preventing gas in the front section of the expansion chamber 31 from entering the passageway 211 within the valve body 21 and reaching the bullet chamber 32.

Figure 2:
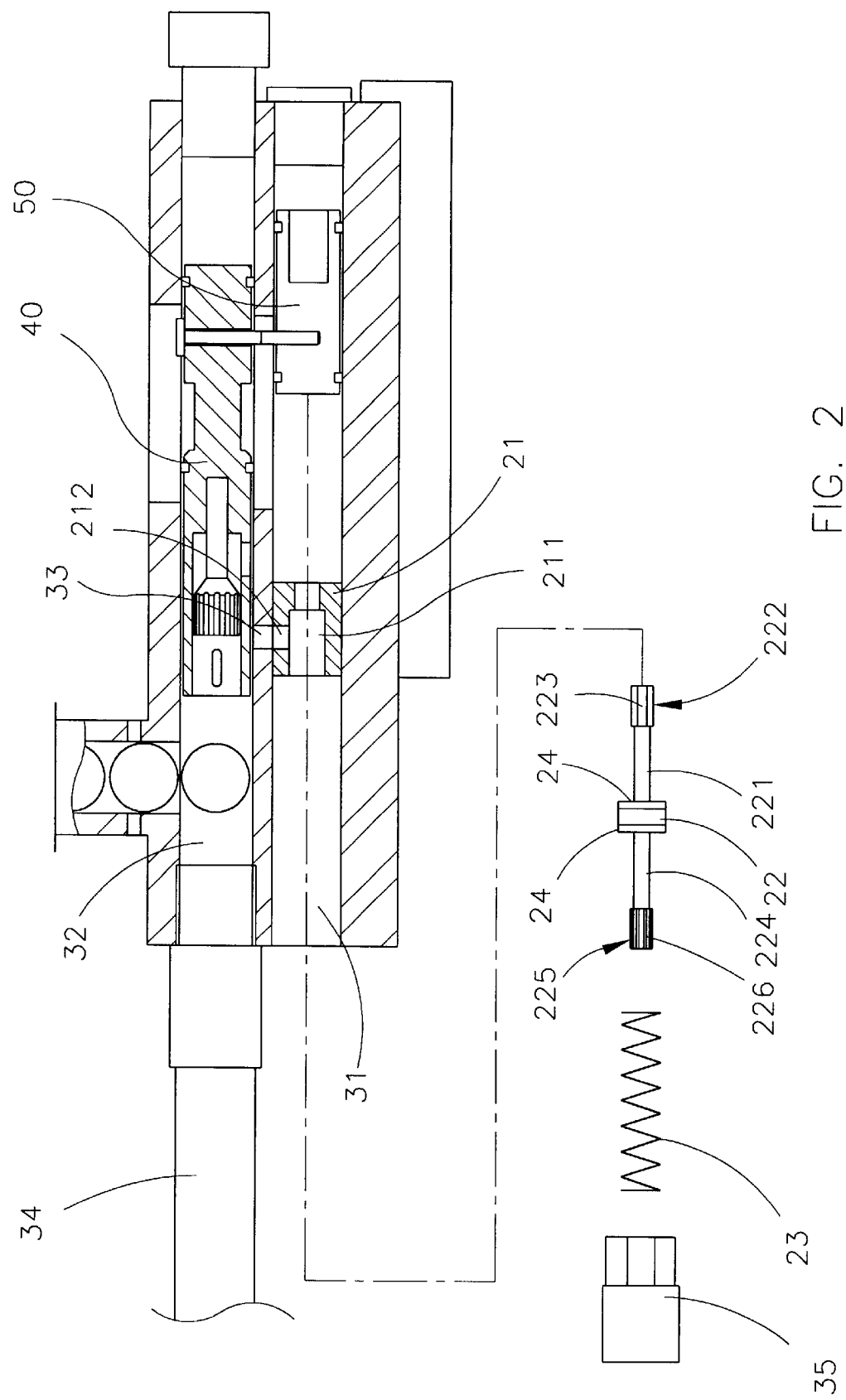
FIG. 2 is an exploded sectional side view of the lacquer bullet gun gas entry valve of the present invention.

A plug 35 is set on the front end of the expansion chamber 31 in the gun case 30. The spring 23 is inserted between the shutter 22 and the plug 35, pushing the shutter 22 tight on the valve body 21. As shown in FIG. 2, the plug 35 is screwed onto the front end of the expansion chamber 31. After removing the plug 35, it is possible to take the spring 23 and the shutter 22 out of the expansion chamber 31.

Figure 3:
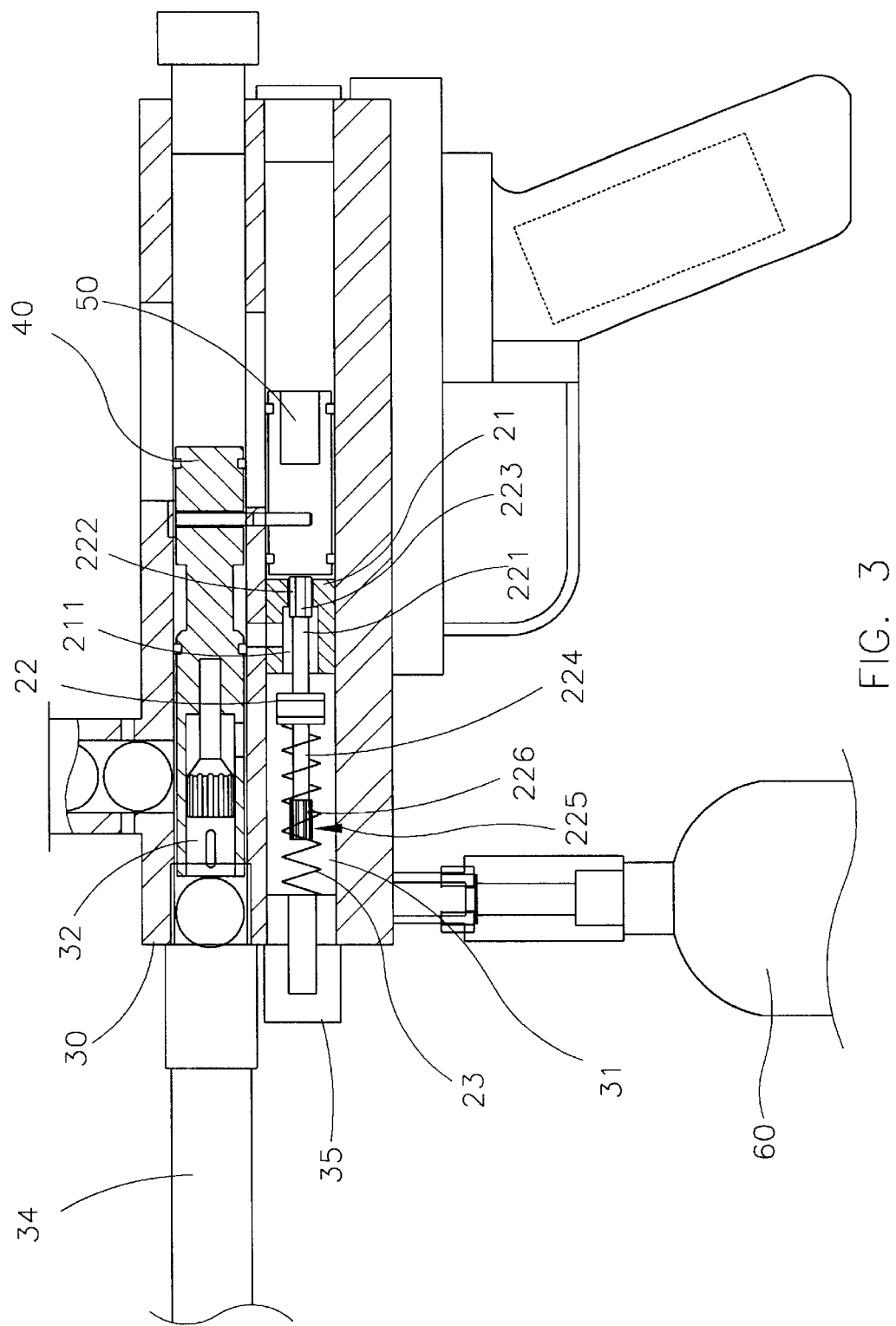
FIG. 3 is a schematic illustration of the lacquer bullet gun gas entry valve of the present invention with the shutter opened.

Referring to FIGS. 1 and 3, a first rod 221 is attached to the first surface of the shutter 22, passing through the passageway 211 along the longitudinal direction inside the valve body 21 and has a far end that reaches out of a rear side of the valve body 21 opposite to the shutter 22. A blocking part 222 is set on the far end of the first rod 221. The blocking part 222 has a peripheral surface with several longitudinal grooves 223. As shown in FIG. 3, when the piston 50 moves forward along with the firing device 40, the first rod 221 is pushed forward, causing the shutter 22 to separate from the valve body 21, so that gas in the front section of the expansion chamber 31 enters the passageway 211 inside the valve body 21 and reaches the bullet chamber 32 to drive a lacquer bullet through the barrel 34.

Referring again to FIG. 3, when the shutter 22 is shifted forward, opening the passageway 211, the passageway 211 at the rear end thereof is blocked by the blocking part 222, leaving only the grooves 223 as a path for compressed gas to enter the rear section of the expansion chamber 31. Thereby the piston 50 is pushed rearward again, taking along the firing device to a rearmost position within the gun case 30.

The main characteristic of the present invention is a second rod 224 which is attached to the second surface of the shutter 22, opposite to the first surface thereof. The first rod 221 and the second rod 224 are aligned along a common axis. A second blocking part 225 is set on a far end of the second rod 224. The second blocking part 225 has a peripheral surface with several longitudinal grooves 226.

Figure 4:
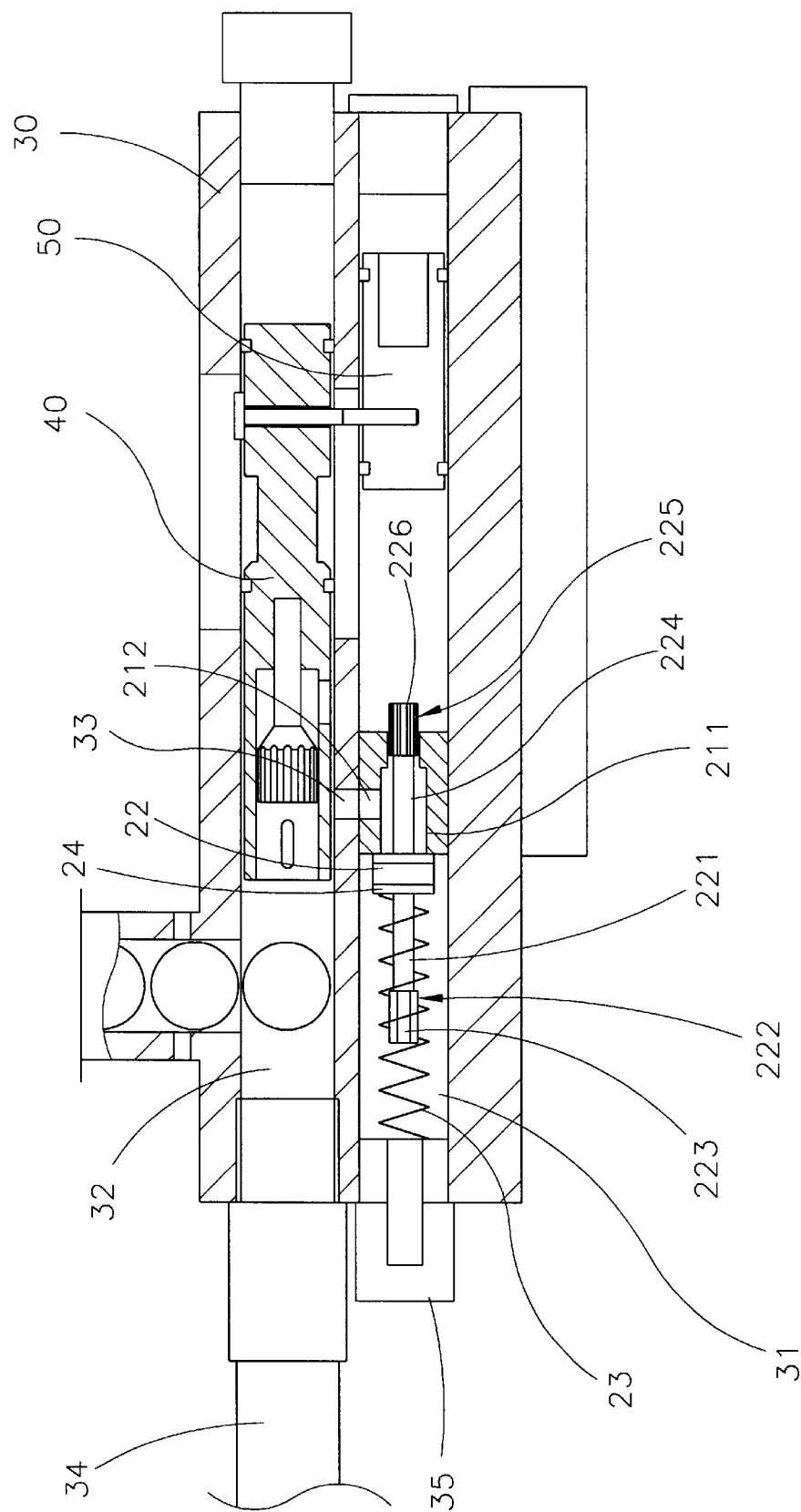
FIG. 4 is a schematic illustration of the present invention after reversing the first and second rods, with the second rod entering the valve body.
Figure 5:
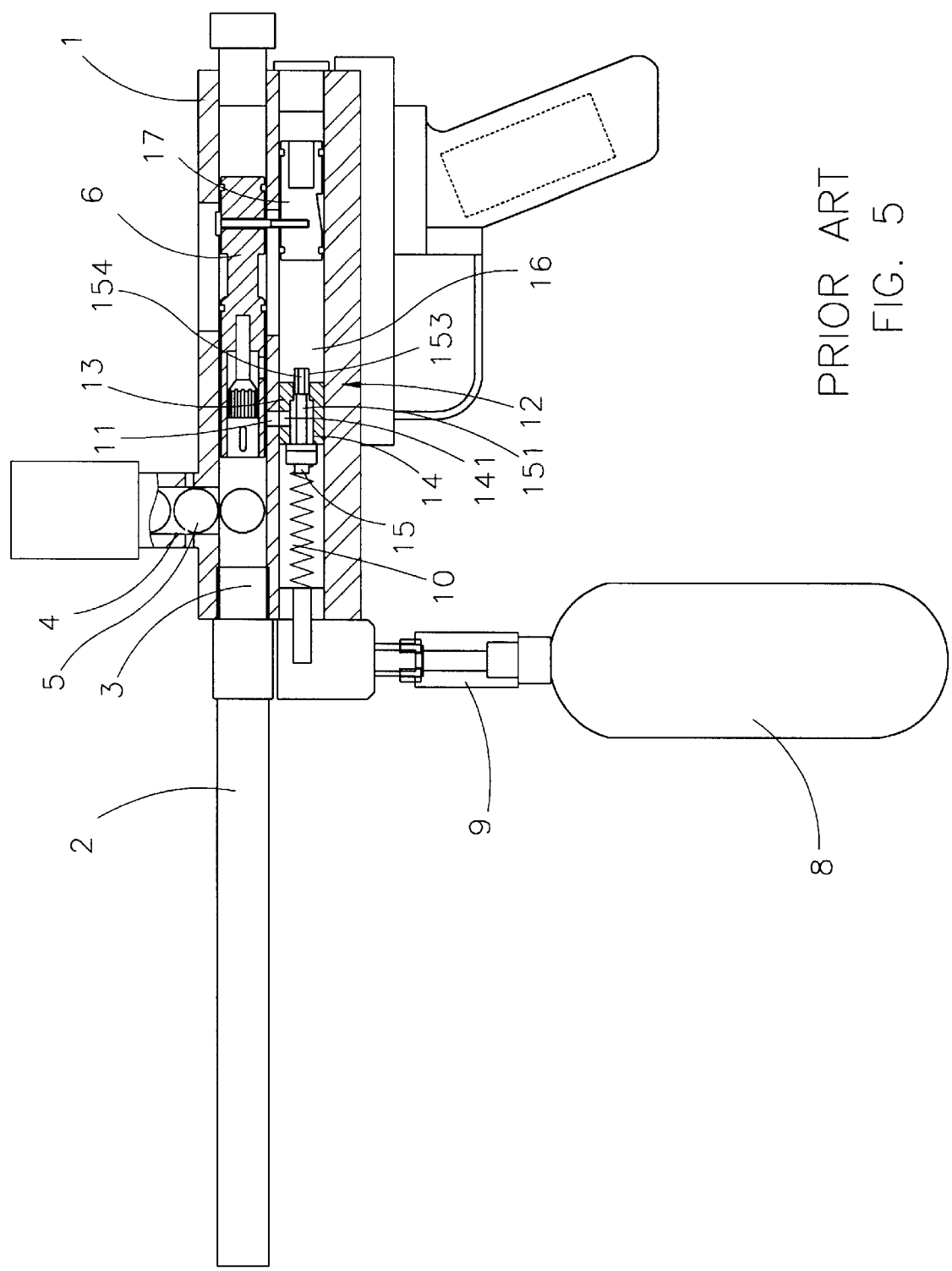
FIG. 5 is a sectional side view of a conventional lacquer bullet gun gas entry valve in conjunction with a lacquer bullet gun.

Referring to FIG. 4, the shutter 22 is placed within the expansion chamber 31 in one of two ways, with either the first rod 221 or the second rod 224 inserted in the passageway 221 inside the valve body 21 and being pushed by the piston 50 for opening the shutter 22. The second rod 224 is of similar length and size as the first rod 221. The number and widths of the grooves 226 on the first blocking part 222, however, differs from the number and widths of the grooves 223 on the second blocking part 225. Thus gas flow through the grooves 226 of the second rod 224 is different from gas flow through the grooves 223 of the first rod 221.

As shown in FIGS. 3A and 4A, the first rod 221 has two grooves 223, while the second rod 224 has six grooves 226. Therefore, by inserting the second rod 224 in the valve body 21, a relatively large gas flow passes through to push the piston 50. On the other hand, when the first rod 221 is inserted in the valve body 21, a reduced large gas flow passes through to push the piston 50. Thus, to adapt to carbon dioxide as a driving agent having a relatively large operating pressure, the first rod 221 is inserted in the valve body 21, so that reduced pressure is applied on the piston 50. On the other hand, to adapt to nitrogen as a driving agent having a relatively small operating pressure, the second rod 224 is inserted in the valve body 21, so that sufficiently large pressure is applied on the piston 50.

The arrangement described above allows to use two different driving agents on a lacquer bullet gun, e.g., carbon dioxide and nitrogen. If several rods are prepared to be substituted, a multitude of driving agents may be employed, increasing flexibility and convenience.

While the invention has been described with reference to a preferred embodiment thereof, it is to be understood that modifications or variations may be easily made without departing from the spirit of this invention which is defined by the appended claims.

What is claimed is:

1. A lacquer bullet gun gas entry valve, used in conjunction with a lacquer bullet gun having a firing device and placed inside said lacquer bullet gun at an entrance of a conduit between an expansion chamber and a bullet chamber, said lacquer bullet gun gas entry valve comprising:

a valve body, located in said expansion chamber, having a longitudinal axis defining a longitudinal direction, with a passageway running along said longitudinal axis, which has a lateral opening, allowing compressed gas, having entered said passageway, to escape to said bullet chamber; and a shutter, tightly closing a front end of said valve body, having a first surface to which a first rod is attached, said first rod longitudinally passing through said passageway and having a far end which extends beyond a rear end of said valve body, so that pushing of said far end by said firing device causes said shutter to be opened, with several longitudinal grooves cut into said far end of said first rod, providing a path for compressed gas to push back said firing device, said shutter furthermore having a second surface opposite to said first surface to which a second rod is attached which is aligned with said first rod on said longitudinal axis, wherein, after reversing said first and second rods, said second rod is inserted in said valve body to be pushed by said firing device for opening said shutter, with several longitudinal grooves cut into a far end of said second rod, said longitudinal grooves of said first rod and said longitudinal grooves of said second rod having different total cross-sections, permitting different quantities of gas to flow through.

2. A lacquer bullet gun gas entry valve according to claim 1, wherein said first and second surfaces of the shutter each carry a sealing element for sealing both said first surface and said second surface against said valve body.

3. A lacquer bullet gun gas entry valve according to claim 1, wherein a removable plug is put on a front end of said expansion chamber and a spring is inserted between said plug and said shutter.

\* \* \* \* \*